(12) United States Patent
Yamine

(10) Patent No.: US 11,661,189 B2
(45) Date of Patent: May 30, 2023

(54) UPGRADE OF NETWORK EQUIPMENT

(71) Applicant: Telefonaktiebolaget LM Ericsson (publ), Stockholm (SE)

(72) Inventor: Badawi Yamine, Beirut (LB)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 374 days.

(21) Appl. No.: 16/760,697

(22) PCT Filed: Nov. 24, 2017

(86) PCT No.: PCT/SE2017/051164
§ 371 (c)(1),
(2) Date: Apr. 30, 2020

(87) PCT Pub. No.: WO2019/103669
PCT Pub. Date: May 31, 2019

(65) Prior Publication Data
US 2020/0331604 A1    Oct. 22, 2020

(51) Int. Cl.
*B64C 39/02* (2023.01)
*G06F 8/658* (2018.01)
(Continued)

(52) U.S. Cl.
CPC ............ *B64C 39/024* (2013.01); *G06F 8/658* (2018.02); *H04W 24/04* (2013.01); *B64U 2101/00* (2023.01); *B64U 2201/20* (2023.01)

(58) Field of Classification Search
CPC .......... B64C 2201/027; B64C 2201/12; B64C 2201/141; B64C 2201/122; B64C 39/024; B64C 2201/146; H04B 7/18504; H04B 17/318; H04B 17/309; H04B 7/01; H04B 7/0413; H04B 7/0617; H04B 17/12; H04B 17/27; H04B 17/345; H04B 1/1036; G06F 8/658; G06F 8/65; H04W 24/04; H04W 24/02; B64U 2101/00; B64U 2201/20
See application file for complete search history.

(56) References Cited

U.S. PATENT DOCUMENTS

2007/0268506 A1   11/2007   Zeldin
2015/0336668 A1*  11/2015   Pasko .................. G05D 1/0011
                                                             701/2
(Continued)

FOREIGN PATENT DOCUMENTS

KR        101780479 B1    10/2017
WO    WO 2017/187223 A1   11/2017

OTHER PUBLICATIONS

Extended European Search Report, EP 17932796.0, dated Nov. 9, 2000, 9 pages.
(Continued)

*Primary Examiner* — Fred A Casca
(74) *Attorney, Agent, or Firm* — Sage Patent Group

(57) ABSTRACT

There are provided mechanisms for upgrading a piece of network equipment. A method is performed by a monitoring unit operatively connectable to the piece of network equipment. The method includes obtaining an indication of a need to upgrade the piece of network equipment. The method includes providing a request towards an unmanned aerial vehicle for the unmanned aerial vehicle to upgrade the piece of network equipment.

28 Claims, 5 Drawing Sheets

(51) Int. Cl.
*H04W 24/04* (2009.01)
*B64U 101/00* (2023.01)

(56) References Cited

U.S. PATENT DOCUMENTS

2016/0320775 A1   11/2016  Priest
2017/0029107 A1*  2/2017   Emami ................ G08G 5/0069
2017/0247108 A1*  8/2017   Ljubuncic ............ G08G 5/0069
2018/0011751 A1*  1/2018   Klein ........................ G06F 9/54

OTHER PUBLICATIONS

International Search Report and Written Opinion of the International Searching Authority, PCT/SE2017/051164, dated Oct. 2, 2018, 14 pages.

\* cited by examiner

UPGRADE OF NETWORK EQUIPMENT

CROSS REFERENCE TO RELATED APPLICATIONS

This application is a 35 U.S.C. § 371 national stage application of PCT International Application No. PCT/SE2017/051164 filed on Nov. 24, 2017, the disclosure and content of which is incorporated by reference herein in its entirety.

TECHNICAL FIELD

Embodiments presented herein relate to methods, a monitoring unit, a control node, computer programs, and a computer program product for upgrading a piece of network equipment.

BACKGROUND

Electronic devices, such as network equipment, might require at a certain point in time maintenance. There are different examples of maintenance. For example, the electronic device could require maintenance in the form of a new configuration, or provisioning of updated software, firmware, hardware, etc. For example, the electronic device could require maintenance in the form of a functional reset (e.g. via a software command or physical interaction by a reset button being pressed, the latter sometimes referred to as a hard reset) in order to resolve a failure event, such as a software failure or interruption, on the electronic device.

Traditionally, each time the electronic device for some of the above examples of maintenance a trained technician is required to make a site visit to the site where the electronic device is installed. Some sites are geographically remote and for some others, even though the sites might be geographically close to the technicians, in some occasion, it might still be difficult or cumbersome for the technician to reach the site in a timely manner. As a consequence, the outage of the electronic device is equal to the time of travel plus the time spent by the technician on site to perform the maintenance.

In further detail, many types of network equipment require two or more site visits. In the first visit the network equipment is installed (e.g. the network equipment is fitted in a cabinet, and modules and cables are installed) then in the second visit the modules of the network equipment are powered on and an initial operational configuration is set for the network equipment (e.g. setting an Internet Protocol (IP) address for the network equipment so that it could be operated remotely).

Although it might be possible to perform remote upgrading of software, there might be some scenarios where remote upgrading is not suitable or even possible. In fact, there might be issues that cannot be resolved by means of remote software upgrading, such as events requiring a reset of the network equipment. Such issues might thus still require a technician to make a site visit in order to perform the needed maintenance on the network equipment.

Hence, there is still a need for more efficient maintenance of network equipment.

SUMMARY

An object of embodiments herein is to provide efficient maintenance of network equipment.

According to a first aspect there is presented a method for upgrading a piece of network equipment. The method is performed by a monitoring unit operatively connectable to the piece of network equipment. The method comprises obtaining an indication of a need to upgrade the piece of network equipment. The method comprises providing a request towards an unmanned aerial vehicle for the unmanned aerial vehicle to upgrade the piece of network equipment.

According to a second aspect there is presented a monitoring unit for upgrading a piece of network equipment. The monitoring unit is operatively connectable to the piece of network equipment and comprises processing circuitry. The processing circuitry is configured to cause the monitoring unit to obtain an indication of a need to upgrade the piece of network equipment. The processing circuitry is configured to cause the monitoring unit to provide a request towards an unmanned aerial vehicle for the unmanned aerial vehicle to upgrade the piece of network equipment.

According to a third aspect there is presented a monitoring unit for upgrading a piece of network equipment. The monitoring unit is operatively connectable to the piece of network equipment. The monitoring unit comprises an obtain module configured to obtain an indication of a need to upgrade the piece of network equipment. The monitoring unit comprises a provide module configured to provide a request towards an unmanned aerial vehicle for the unmanned aerial vehicle to upgrade the piece of network equipment.

According to an embodiment the monitoring unit of the second and/or third aspect further comprises a storage medium storing a set of operations as defined by the actions performed by the monitoring unit according to the first aspect. The processing circuitry is configured to retrieve the set of operations from the storage medium to cause the monitoring unit to perform the set of operations.

According to a fourth aspect there is presented a computer program for upgrading a piece of network equipment. The computer program comprises computer program code which, when run on processing circuitry of a monitoring unit, causes the monitoring unit to perform a method according to the first aspect.

According to a fifth aspect there is presented a method for upgrading a piece of network equipment. The method comprises obtaining, by a control node of an unmanned aerial vehicle, a request from a monitoring unit operatively connectable to the piece of network equipment for the unmanned aerial vehicle to upgrade the piece of network equipment. The method comprises instructing, by the control node, the unmanned aerial vehicle to upgrade the piece of network equipment.

According to a sixth aspect there is presented a control node for upgrading a piece of network equipment. The control node comprises processing circuitry. The processing circuitry is configured to cause the control node to obtain a request from a monitoring unit operatively connectable to the piece of network equipment for an unmanned aerial vehicle to upgrade a piece of network equipment. The processing circuitry is configured to cause the control node to instruct the unmanned aerial vehicle to upgrade the piece of network equipment.

According to a seventh aspect there is presented a control node for upgrading a piece of network equipment. The control node comprises an obtain module configured to obtain a request from a monitoring unit operatively connectable to the piece of network equipment for an unmanned aerial vehicle to upgrade a piece of network equipment. The control node comprises an instruct module configured to instruct the unmanned aerial vehicle to upgrade the piece of network equipment.

According to an embodiment the control node of the sixth and/or seventh aspect further comprises a storage medium storing a set of operations as defined by the actions performed by the control node according to the fifth aspect. The processing circuitry is configured to retrieve the set of operations from the storage medium to cause the control node to perform the set of operations.

According to an eight aspect there is presented a computer program for upgrading a piece of network equipment. The computer program comprises computer program code which, when run on processing circuitry of a control node, causes the control node to perform a method according to the fifth aspect.

According to a ninth aspect there is presented a computer program product comprising a computer program according to at least one of the fourth aspect and the eight aspect and a computer readable storage medium on which the computer program is stored. The computer readable storage medium could be a non-transitory computer readable storage medium.

Advantageously these methods, these monitoring units, these control nodes, and these computer programs enable efficient maintenance of the piece of network equipment.

Advantageously these methods, these monitoring units, these control nodes, and these computer programs enable the period of outages of the piece of network equipment to be reduced.

Advantageously the reduced periods of outages enable improved network performance.

It is to be noted that any feature of the first, second, third, fourth, fifth, sixth seventh, eight, and ninth aspects may be applied to any other aspect, wherever appropriate. Likewise, any advantage of the first aspect may equally apply to the second, third, fourth, fifth, sixth, seventh, eight, and/or ninth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
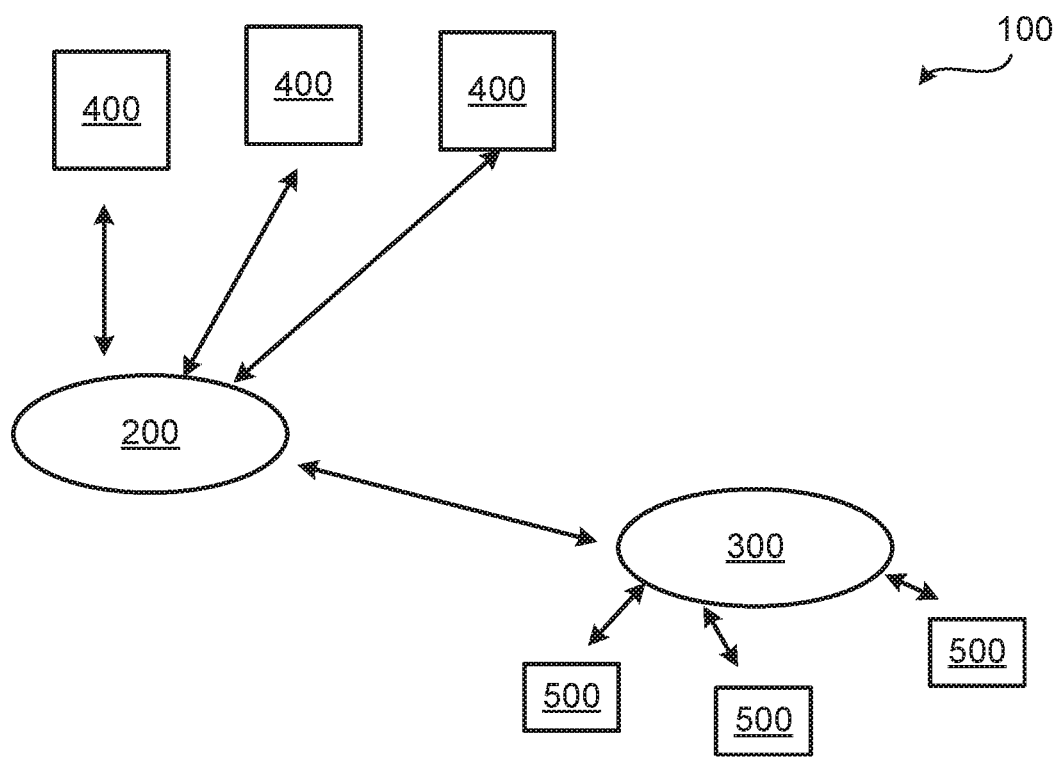
FIG. 1 is a schematic diagram illustrating a communications network according to embodiments.

FIG. 1 is a schematic diagram illustrating a communications network 100 where embodiments presented herein can be applied. The communications network 100 comprises a monitoring unit 200, a control node 300, at least one piece of network equipment 400, and at least one unmanned aerial vehicle 500. In general terms, the monitoring unit 200 is intended to monitor the at least one piece of network equipment 400 for upgrading needs. In general terms, the control node 300 controls operations of the at least one unmanned aerial vehicle 500. Further aspects of the monitoring unit 200, the control node 300, the at least one piece of network equipment 400, and the at least one unmanned aerial vehicle 500 will be disclosed below. Double directed arrows represent operational connections. Thus, the monitoring unit 200 is operatively connected to the at least one piece of network equipment 400 and the control node 300. The control node 300 is additionally operatively connected to the at least one unmanned aerial vehicle 500.

The embodiments disclosed herein relate to mechanisms for upgrading the piece of network equipment 400. In order to obtain such mechanisms there is provided a monitoring unit 200, a method performed by the monitoring unit 200, a computer program product comprising code, for example in the form of a computer program, that when run on processing circuitry of the monitoring unit 200, causes the monitoring unit 200 to perform the method. In order to obtain such mechanisms there is further provided a control node 300, a method performed by the control node 300, and a computer program product comprising code, for example in the form of a computer program, that when run on processing circuitry of the control node 300, causes the control node 300 to perform the method.

As noted above there might be some scenarios where remote upgrading is not suitable or even possible. In fact, there might be issues that cannot be resolved by means of remote software upgrading, such as events requiring a reset of the network equipment. Such issues might thus still require a technician to make a site visit in order to perform the needed maintenance on the network equipment.

The herein disclosed embodiments are therefore based on upgrading the piece of network equipment 400 by means of the unmanned aerial vehicle 500.

Figure 2:
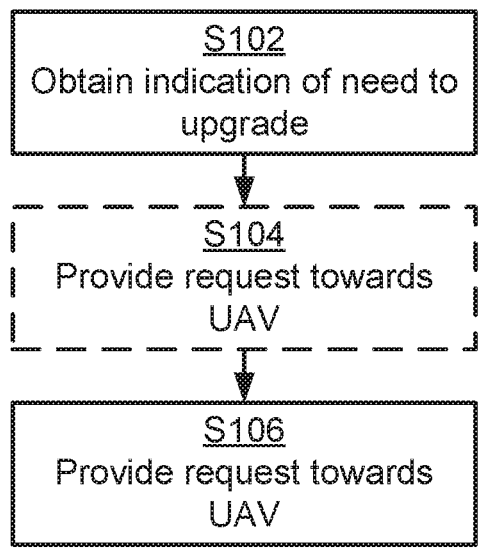
FIGS. 2 and 3 are flowcharts of methods according to embodiments.

Reference is now made to FIG. 2 illustrating a method for upgrading a piece of network equipment 400 as performed by the monitoring unit 200 according to embodiments. The monitoring unit 200 is operatively connectable to the piece of network equipment 400.

It is assumed that there is a need for upgrade at the piece of network equipment 400. It is further assumed that the monitoring unit 200 becomes aware of this need. Particularly, the monitoring unit 200 is configured to perform step S102:

S102: The monitoring unit 200 obtains an indication of a need to upgrade the piece of network equipment 400. Examples of how the monitoring unit 200 might obtain the indication will be provided below.

The monitoring unit 200 then issues instructions for the unmanned aerial vehicle 500 to upgrade the piece of network equipment 400. Particularly, the monitoring unit 200 is configured to perform step S106:

S106: The monitoring unit 200 provides a request towards the unmanned aerial vehicle 500 for the unmanned aerial vehicle 500 to upgrade the piece of network equipment 400.

Embodiments relating to further details of upgrading a piece of network equipment 400 as performed by the monitoring unit 200 will now be disclosed.

There may be different ways for the monitoring unit 200 to become aware of the need for upgrade at the piece of network equipment 400.

In some aspects the indication is obtained directly from the piece of network equipment 400. Particularly, according to an embodiment, the indication is obtained as a notification from the piece of network equipment 400.

There could be different examples, and content, of such notifications. Particularly, according to an embodiment, the notification comprises an indication of what upgrade is needed for the piece of network equipment 400.

In other aspects the indication is obtained as an indirect indication. Such an indirect indication could be defined by a lack of response to, or lack of communications with, the piece of network equipment 400. Particularly, according to an embodiment, the indication is defined by a lack of response to, or lack of communications with, the piece of network equipment 400.

In some aspects the monitoring unit 200 requests diagnostics etc. to be performed on the piece of network equipment 400. Particularly, according to an embodiment, the monitoring unit 200 is configured to perform (optional) step S104:

S104: The monitoring unit 200 provides a further request towards the unmanned aerial vehicle 500 for the unmanned aerial vehicle 500 to perform diagnostics on the piece of network equipment 400, to perform maintenance of the piece of network equipment 400, and/or to enquire the piece of network equipment 400 for information.

Examples of diagnostics include, but are not limited to, collecting data, such as measurements, from the piece of network equipment 400, recoding a photographic image of the piece of network equipment 400, etc. Such diagnostics, etc. could identify what upgrade is needed for the piece of network equipment 400. Therefore, in some aspect the diagnostics etc. should be performed before the upgrading. Particularly, according to an embodiment, the request for the unmanned aerial vehicle to upgrade the piece of network equipment is a second request, and the further request is provided before the second request is provided. That is, step S104 is performed before step S106.

There may be different ways for the monitoring unit 200 to inform the unmanned aerial vehicle 500 to upgrade the piece of network equipment 400.

In some aspects the monitoring unit 200 explicitly informs where the piece of network equipment 400 is located and the identity of the piece of network equipment 400. Particularly, according to an embodiment, the request comprises an identification of the piece of network equipment 400 and location information of the piece of network equipment 400.

In some aspects the monitoring unit 200 explicitly informs what upgrade of the piece of network equipment 400 is needed. Particularly, according to an embodiment, the request comprises an identification of how to upgrade the piece of network equipment 400, and/or a cause of the need to upgrade the piece of network equipment 400.

There may be different ways for the monitoring unit 200 to provide a request towards the unmanned aerial vehicle 500. In some aspects the request is provided to a controller of the unmanned aerial vehicle 500. Particularly, according to an embodiment, the request is provided to the control node 300 of the unmanned aerial vehicle 500.

Figure 3:
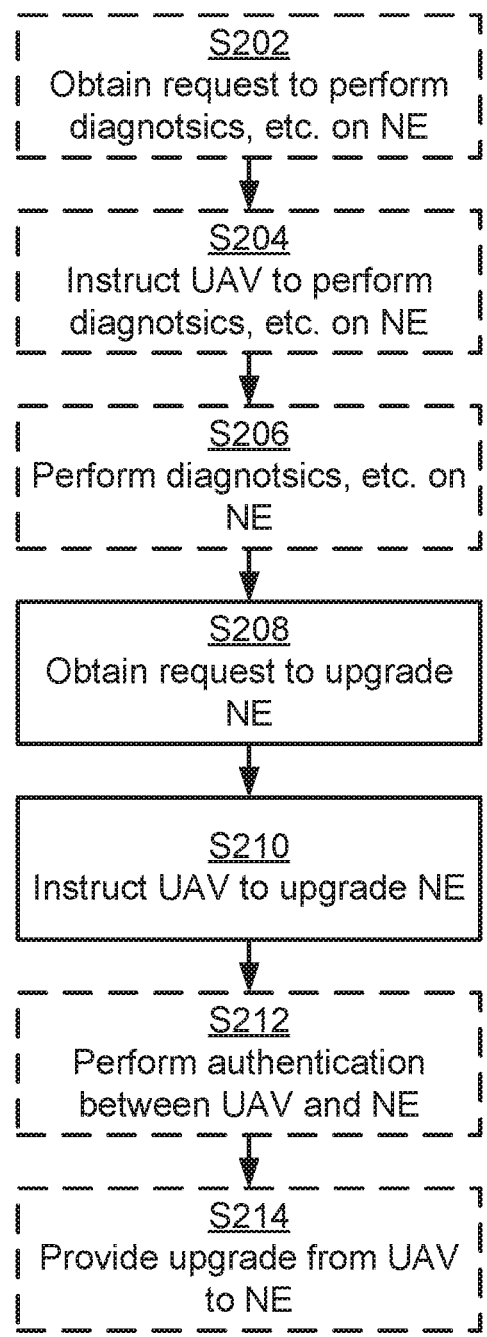

Reference is now made to FIG. 3 illustrating a method for upgrading a piece of network equipment 400 as partly performed by the control node 300 of the unmanned aerial vehicle 500 according to embodiments.

As disclosed above, the monitoring unit 200 in step S106 provides a request towards the unmanned aerial vehicle 500 for the unmanned aerial vehicle 500 to upgrade the piece of network equipment 400. It is assumed that this request is obtained by the control node 300. Thus, the control node 300 is configured to perform step S208:

S208: The control node 300 obtains a request, from the monitoring unit 200 operatively connectable to the piece of network equipment 400, for the unmanned aerial vehicle 500 to upgrade the piece of network equipment 400.

In response to this request the control node 300 contacts the unmanned aerial vehicle 500. Particularly, the control node 300 is configured to perform step S208:

S210: The control node 300 instructs the unmanned aerial vehicle 500 to upgrade the piece of network equipment 400.

Embodiments relating to further details of upgrading a piece of network equipment 400 as partly performed by the control node 300 will now be disclosed.

As in the illustrative example of FIG. 1 there might be at least one unmanned aerial vehicle 500. In general terms, there might be a plurality of unmanned aerial vehicles 500 that are under the control of the control node 300. Particularly, according to an embodiment, the unmanned aerial vehicle 500 is selected from a pool of unmanned aerial vehicles 500 which the control node 300 controls.

As disclosed above, in some aspects the monitoring unit 200 explicitly informs where the piece of network equipment 400 is located and the identity of the piece of network equipment 400. Particularly, according to an embodiment, the request comprises an identification of the piece of network equipment 400 and location information of the piece of network equipment 400.

As disclosed above, in some aspects the monitoring unit 200 explicitly informs what upgrade of the piece of network equipment 400 is needed. Particularly, according to an embodiment, the request comprises an identification of how to upgrade the piece of network equipment 400 and/or an identification of a cause of the need to upgrade the piece of network equipment 400.

The control node 300 might use all available information (such as identification of the piece of network equipment 400 and location information of the piece of network equipment 400 as well as identification of how to upgrade the piece of network equipment 400 and/or an identification of a cause of the need to upgrade the piece of network equipment 400) to determine which unmanned aerial vehicles 500 is to perform the upgrade of the piece of network equipment 400.

Particularly, according to an embodiment, which unmanned aerial vehicle 500 in the pool of unmanned aerial vehicles 500 to select is dependent on the identification of how to upgrade the piece of network equipment 400 and/or the identification of the cause of the need to upgrade the piece of network equipment 400.

In some aspects the unmanned aerial vehicle 500 is only allowed to upgrade the piece of network equipment 400 after authentication. Particularly, according to an embodiment, the unmanned aerial vehicle 500 only is allowed to upgrade the piece of network equipment 400 after successful authentication of the unmanned aerial vehicle 500 by the piece of network equipment 400. Particularly, according to an embodiment, the unmanned aerial vehicle 500 and the piece of network equipment 400 are configured to perform (optional) step S212 is performed:

S212: Authentication is performed between the unmanned aerial vehicle 500 and the piece of network equipment 400.

There might be different ways for authentication between the unmanned aerial vehicle 500 and the piece of network equipment 400. Particularly, according to an embodiment, the unmanned aerial vehicle 500 is provided with a near-field communications interface, a radio-frequency identification (RFID) tag, and/or a Bluetooth interface for authenticating with the piece of network equipment 400. Likewise, according to an embodiment, the piece of network equipment 400 is provided with a near-field communications interface, a radio-frequency identification (RFID) tag reader, and/or a Bluetooth interface for authenticating the unmanned aerial vehicle 500.

As disclosed above, in some aspects the monitoring unit 200 requests diagnostics etc. to be performed on the piece of network equipment 400. Particularly, according to an embodiment, the control node 300 is configured to perform (optional) steps S202 and S204:

S202: The control node 300 obtains a further request from the monitoring unit 200 for the unmanned aerial vehicle 500 to perform diagnostics on the piece of network equipment 400, to perform maintenance of the piece of network equipment 400, and/or enquire the piece of network equipment 400 for information.

S204: The control node 300 instructs the unmanned aerial vehicle 500 to perform diagnostics on the piece of network equipment 400, to perform maintenance of the piece of network equipment 400, and/or to enquire the piece of network equipment 400 for information.

As disclosed above, in some aspect the diagnostics etc. should be performed before the upgrading. Particularly, according to an embodiment, the request for the unmanned aerial vehicle to upgrade the piece of network equipment is a second request, and the further request is obtained before the second request is obtained.

The instructions issued by the control node 300 in step S204 are assumed to be received by the unmanned aerial vehicle 500. The unmanned aerial vehicle 500 then acts as being instructed by the control node 300. Particularly, according to an embodiment, the unmanned aerial vehicle 500 is configured to perform (optional) step S206:

S206: The unmanned aerial vehicle 500 performs diagnostics on the piece of network equipment 400, performs maintenance of the piece of network equipment 400, and/or enquires the piece of network equipment 400 for information.

The instructions issued by the control node 300 in step S210 are assumed to be received by the unmanned aerial vehicle 500. The unmanned aerial vehicle 500 then acts as being instructed by the control node 300. Particularly, according to an embodiment, the unmanned aerial vehicle 500 is configured to perform (optional) step S214:

S214: The unmanned aerial vehicle 500 provides an upgrade to the piece of network equipment 400.

There could be different ways for the unmanned aerial vehicle 500 to provide an upgrade to the piece of network equipment 400.

In some aspects the upgrade is provided by means of physical interaction between the unmanned aerial vehicle 500 and the piece of network equipment 400. Particularly, according to an embodiment, providing the upgrade involves physical interaction between the unmanned aerial vehicle 500 and the piece of network equipment 400.

In some aspects the unmanned aerial vehicle 500 comprises a member (vertically or horizontally oriented) for physical interaction with the piece of network equipment 400. Particularly, according to an embodiment, the unmanned aerial vehicle 500 is provided with a vertically and/or horizontally extending member configured for physical interaction with the piece of network equipment 400.

In some aspects the piece of network equipment 400 comprises a member (vertically or horizontally oriented) for physical interaction with the unmanned aerial vehicle 500. Particularly, according to an embodiment, the piece of network equipment 400 is provided with a vertically and/or horizontally arranged interface configured for physical interaction with the unmanned aerial vehicle 500.

In some aspects the upgrade is provided by means of wireless transmission from the unmanned aerial vehicle 500 to the piece of network equipment 400. Particularly, according to an embodiment, providing the upgrade involves short-range wireless communications between the unmanned aerial vehicle 500 and the piece of network equipment 400.

In some aspects, which mechanism for the unmanned aerial vehicle 500 to use for providing the upgrading (physical interaction or wireless transmission) is based on type and/or size of the upgrade. Particularly, according to an embodiment, how to provide the upgrade from the unmanned aerial vehicle 500 to the piece of network equipment 400 is dependent on type of the upgrade and/or storage capacity needed for the upgrade.

There could be different examples of upgrades of the piece of network equipment 400. In some non-limiting examples the upgrade concerns rebooting the piece of network equipment 400, and/or updating software and/or firmware of the piece of network equipment 400.

There could be different examples of pieces of network equipment 400. In some non-limiting examples the piece of network equipment 400 is any of radio access network node, a radio base station, a base transceiver station, a node B, an evolved node B, a g node B, an access point, an access node, or a core network node.

Particularly, according to an embodiment, the piece of network equipment 400 is a radio access network node or a core network node.

Figure 4:
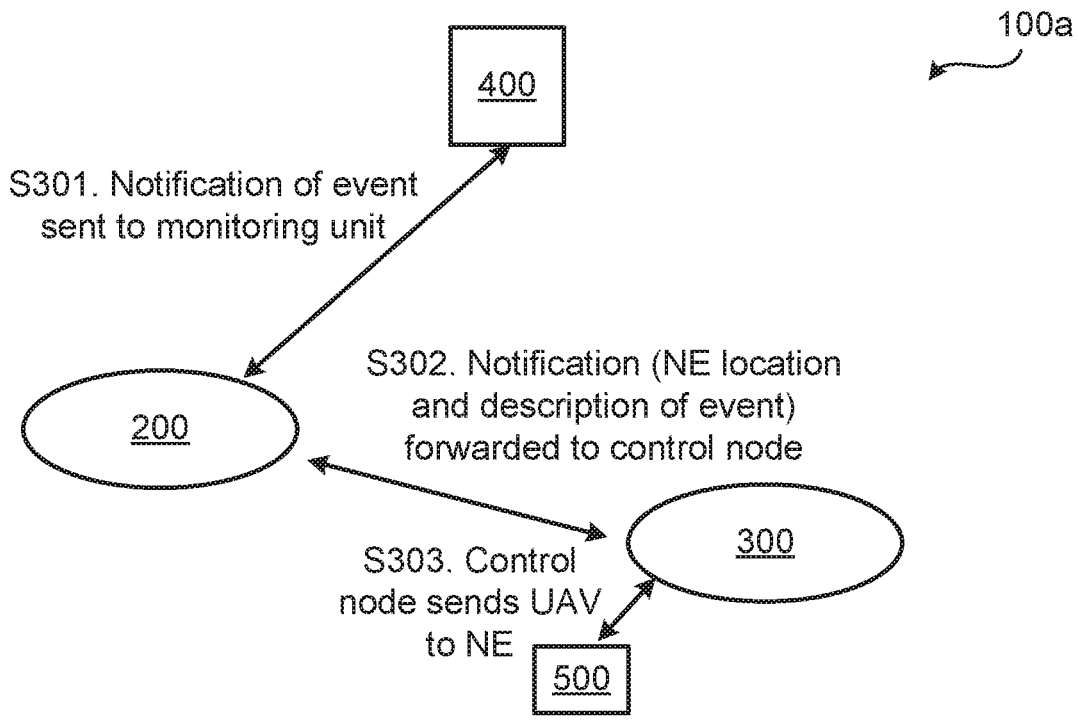
FIGS. 4 and 5 are schematic illustration of communications networks according to embodiments.

A first particular embodiment for upgrading the piece of network equipment 400 based on at least some of the above disclosed embodiments will now be disclosed in detail with reference to the communications network 100a in FIG. 4. The communications network 100a of FIG. 4 is similar to that of FIG. 1 but for simplicity, and without loss of generality, there is only illustrated one piece of network equipment 400 and one unmanned aerial vehicle 500.

S301: An event occurs on the piece of network equipment 400. The event requires an upgrade of the piece of network equipment 400. The piece of network equipment 400 therefore sends a notification to the monitoring unit 200, which is obtained by the monitoring unit 200 as in step S102.

The notification might comprise an indication of what upgrade is needed for the piece of network equipment 400. In one example, the event could be a particular (predefined) alarm that has been triggered on the piece of network equipment 400. In another example, the event could be power on of a newly installed piece of network equipment 400.

S302: The monitoring unit 200 provides a request for upgrade the piece of network equipment 400 to the control node 300, as in steps S210, S208. The request comprises a description of the event, identification of the piece of network equipment 400, and location information of the piece of network equipment 400.

S303: The control node 300 instructs the unmanned aerial vehicle 500 to upgrade the piece of network equipment 400, as in step S210. The unmanned aerial vehicle 500 might be selected from a pool of unmanned aerial vehicles 500 based e.g. on how to upgrade the piece of network equipment 400 and/or the cause of the need to upgrade the piece of network equipment 400.

Figure 5:
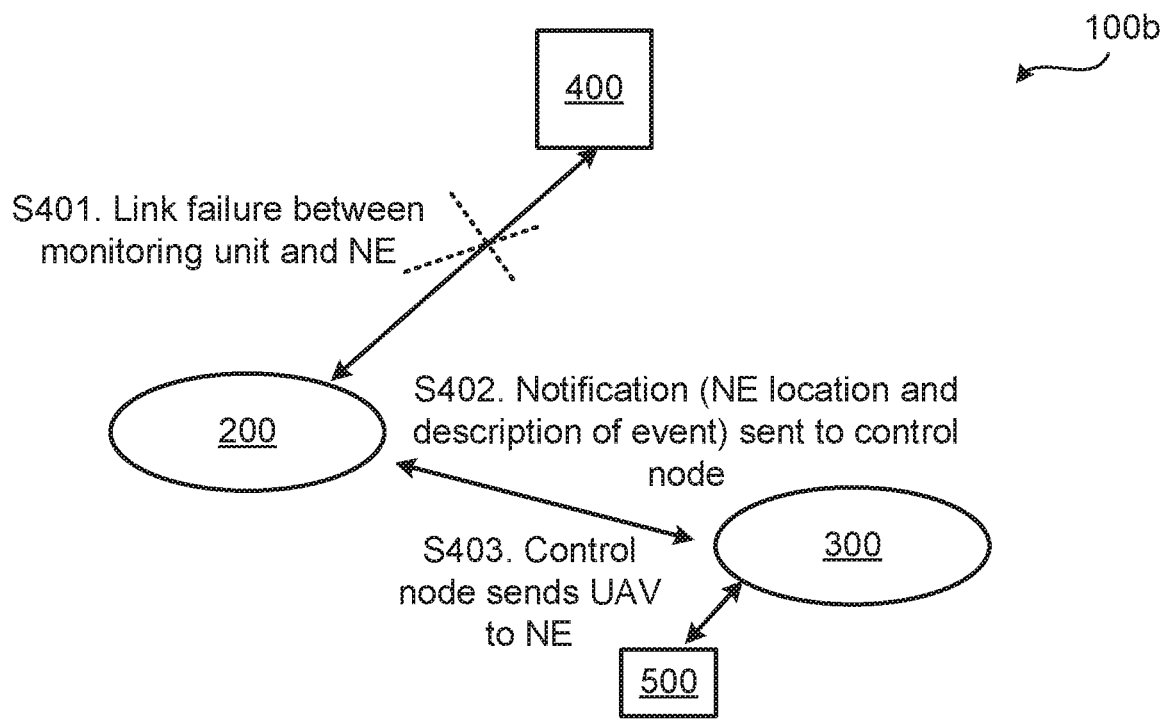

A second particular embodiment for upgrading the piece of network equipment 400 based on at least some of the above disclosed embodiments will now be disclosed in detail with reference to the communications network 100b in FIG. 5. The communications network 100b of FIG. 5 is similar to that of FIG. 1 but for simplicity, and without loss of generality, there is only illustrated one piece of network equipment 400 and one unmanned aerial vehicle 500.

S401: A link failure between the monitoring unit 200 and the piece of network equipment 400 provides the monitoring unit 200 with an indication is defined by a lack of response to, or lack of communications with, the piece of network equipment 400, as in step S102.

S402: The monitoring unit 200 provides a request for upgrade the piece of network equipment 400 to the control node 300, as in steps S210, S208. The request comprises a description of the event, identification of the piece of network equipment 400, and location information of the piece of network equipment 400.

Figure 6:
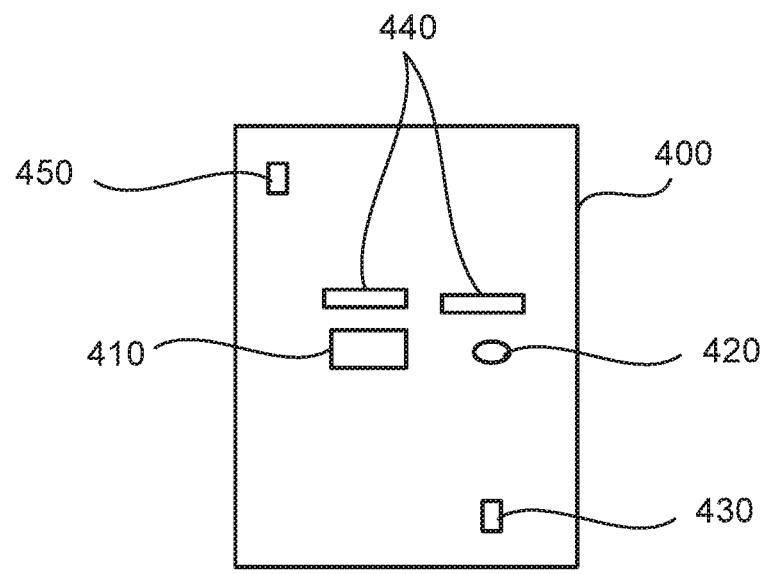
FIG. 6 is a schematic illustration of a piece of network equipment according to an embodiment.

S403: The control node 300 instructs the unmanned aerial vehicle 500 to upgrade the piece of network equipment 400, as in step S210. The unmanned aerial vehicle 500 might be selected from a pool of unmanned aerial vehicles 500 based e.g. on how to upgrade the piece of network equipment 400 and/or the cause of the need to upgrade the piece of network equipment 400. FIG. 6 is a schematic illustration of a piece of network equipment 400 according to an embodiment.

The piece of network equipment 400 comprises a Universal Serial Bus (USB) slot 410 for receiving a USB drive 510 of the unmanned aerial vehicle 500. Such a USB slot 410 can be used for the piece of network equipment 400 to be provided with the upgrade (such as software and/or firmware) by means of physical interaction with the unmanned aerial vehicle 500. The USB slot 410 is thus vertically and horizontally placed at the piece of network equipment 400 such that it can be reached by the vertically and/or horizontally extending member 520 of the unmanned aerial vehicle 500. In some aspects the USB slot 410 is protected, for example by a cover, preventing the USB drive 510 of the unmanned aerial vehicle 500 to be inserted. In this respect the cover might be motorized and controlled by a control unit, whereby the control unit instructs the cover to be removed, so as to expose the USB slot 410, only upon the control unit receiving an indication of successful authentication of the unmanned aerial vehicle 500. Once the upgrade has been provided to the piece of network equipment 400, the cover is automatically moved back in place so as to cover the USB slot 410 in order to prevent unauthorized access to the piece of network equipment 400.

The piece of network equipment 400 comprises a touch-type reset button 420 for being touched by a vertically and/or horizontally extending member 520 of the unmanned aerial vehicle 500. Such a touch-type reset button 420 can be used for the piece of network equipment 400 to be provided with the upgrade (such as a reset) by means of physical interaction with the unmanned aerial vehicle 500. The touch-type reset button 420 is thus vertically and horizontally placed at the piece of network equipment 400 such that it can be reached by the vertically and/or horizontally extending member 520 of the unmanned aerial vehicle 500.

The piece of network equipment 400 comprises a reset button 430 for traditional reset of the piece of network equipment 400. Such a reset button 430 can be used for the piece of network equipment 400 to be reset by a technician.

The piece of network equipment 400 comprises at least one RFID tag reader 440 for authenticating the unmanned aerial vehicle 500 before any upgrade is provided from the unmanned aerial vehicle 500 to the piece of network equipment 400.

The piece of network equipment 400 comprises a short-range wireless communications interface 450, such as a near-field communications interface or a Bluetooth interface, for communications with a short-range wireless communications interface 540 of the unmanned aerial vehicle 500. Such a short-range wireless communications interface 450 can be used for the piece of network equipment 400 to be provided with the upgrade (such as software and/or firmware) by means of wireless transmission from the unmanned aerial vehicle 500 to the piece of network equipment 400. Further, the short-range wireless communications interface 450 might be used by the piece of network equipment 400 to authenticate the unmanned aerial vehicle 500. Thus, this might alleviate the necessity for the piece of network equipment 400 to comprise at least one RFID tag reader 440 for authenticating the unmanned aerial vehicle 500.

Figure 7:
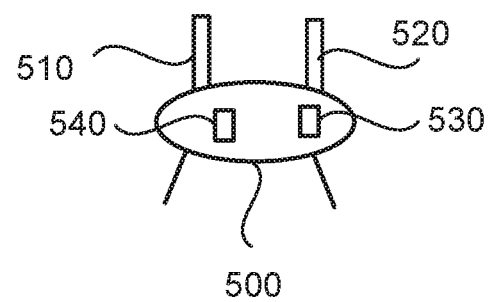
FIG. 7 is a schematic illustration of an unmanned aerial vehicle according to an embodiment.

FIG. 7 is a schematic illustration of an unmanned aerial vehicle 500 according to an embodiment.

The unmanned aerial vehicle 500 comprises a vertically and/or horizontally extending member 520 for touching a touch-type reset button 420 of the piece of network equipment 400. Such a vertically and/or horizontally extending member can be used for the unmanned aerial vehicle 500 to provide the upgrade (such as a reset) by means of physical interaction with the piece of network equipment 400.

The unmanned aerial vehicle 500 comprises an USB drive 510 (also variously known as a, thumb drive, pen drive, jump drive, disk key, disk on key, flash-drive, memory stick or USB memory) for being inserted in a USB slot 410 of the piece of network equipment 400. Such a USB drive can be used for the unmanned aerial vehicle 500 to provide the upgrade (such as software and/or firmware) by means of physical interaction with the piece of network equipment 400. Alternatively, the USB drive is carried by, or is an integral part of, the vertically and/or horizontally extending member 520.

The unmanned aerial vehicle 500 comprises at least one RFID tag 530 for enabling the unmanned aerial vehicle 500 to be authenticated by the piece of network equipment 400 before any upgrade is provided from the unmanned aerial vehicle 500 to the piece of network equipment 400.

The unmanned aerial vehicle 500 comprises a short-range wireless communications interface 540, such as a near-field communications interface or a Bluetooth interface, for communications with a short-range wireless communications interface 450 of the piece of network equipment 400. Such a short-range wireless communications interface 540 can be used for the unmanned aerial vehicle 500 to provide the upgrade (such as software and/or firmware) by means of wireless transmission from the unmanned aerial vehicle 500 to the piece of network equipment 400. Further, the short-range wireless communications interface 540 might be used to the unmanned aerial vehicle 500 to be authenticated by the piece of network equipment 400. Thus, this might alleviate the necessity for the unmanned aerial vehicle 500 to comprise at least one RFID tag 530 for being authenticated by the piece of network equipment 400.

In some aspects the piece of network equipment 400 is enclosed in a locked cabinet. Therefore, additionally or alternatively, the RFID tag 530 or the short-range wireless communications interface 540 could be used for the unmanned aerial vehicle 500 to access the piece of network equipment 400 in case where the piece of network equipment 400 is enclosed in such a cabinet. The cabinet might therefore comprise a corresponding RFID tag reader or short-range wireless communications interface. The cabinet might then be configured to, after successful authentication of the unmanned aerial vehicle 500, open its door, or doors, for the unmanned aerial vehicle 500 to access the piece of network equipment 400 in order to provide the upgrade.

In this respect the door, or doors, might thus be motorized and controlled by a control unit, whereby the control unit instructs the lock to unlock and the motorized door, or doors, to open upon the control unit receiving an indication of successful authentication of the unmanned aerial vehicle 500 from the RFID tag reader or short-range wireless communications interface of the cabinet. Once the upgrade has been provided to the piece of network equipment 400, the door, or doors, of the cabinet are automatically closed and locked in order to prevent unauthorized access to the piece of network equipment 400.

Figure 8:
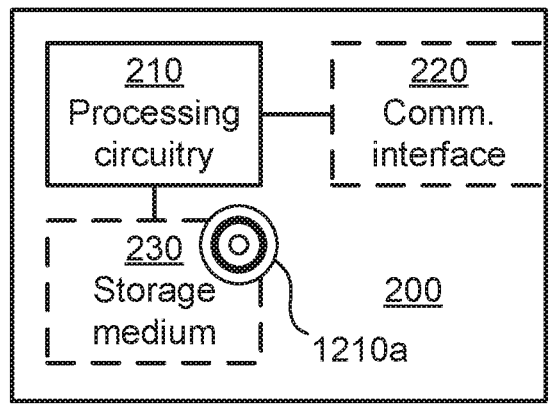
FIG. 8 is a schematic diagram showing functional units of a monitoring unit according to an embodiment.

FIG. 8 schematically illustrates, in terms of a number of functional units, the components of a monitoring unit 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1210a (as in FIG. 12), e.g. in the form of a storage medium 230. The processing circuitry 210 may further be provided as at least one application specific integrated circuit (ASIC), or field programmable gate array (FPGA).

Particularly, the processing circuitry 210 is configured to cause the monitoring unit 200 to perform a set of operations, or steps, S102-S106, as disclosed above. For example, the storage medium 230 may store the set of operations, and the processing circuitry 210 may be configured to retrieve the set of operations from the storage medium 230 to cause the monitoring unit 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The monitoring unit 200 may further comprise a communications interface 220 for communications with other entities, units, nodes, devices, and functions of the communications network 100. As such the communications interface 220 may comprise one or more transmitters and receivers, comprising analogue and digital components.

The processing circuitry 210 controls the general operation of the monitoring unit 200 e.g. by sending data and control signals to the communications interface 220 and the storage medium 230, by receiving data and reports from the communications interface 220, and by retrieving data and instructions from the storage medium 230. Other components, as well as the related functionality, of the monitoring unit 200 are omitted in order not to obscure the concepts presented herein.

Figure 9:
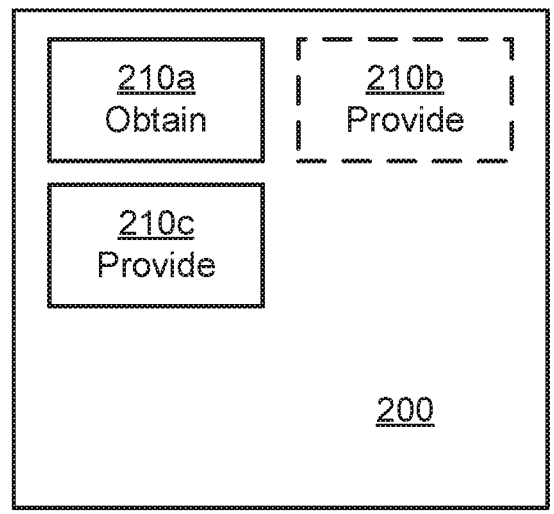
FIG. 9 is a schematic diagram showing functional modules of a monitoring unit according to an embodiment.

FIG. 9 schematically illustrates, in terms of a number of functional modules, the components of a monitoring unit 200 according to an embodiment. The monitoring unit 200 of FIG. 9 comprises a number of functional modules; an obtain module 210a configured to perform step S102 and a provide module 210c configured to perform step S106. The monitoring unit 200 of FIG. 9 may further comprise a number of optional functional modules, such as a provide module 210b configured to perform step S104. In general terms, each functional module 210a-210c may be implemented in hardware or in software. Preferably, one or more or all functional modules 210a-210c may be implemented by the processing circuitry 210, possibly in cooperation with the communications interface 220 and/or the storage medium 230. The processing circuitry 210 may thus be arranged to from the storage medium 230 fetch instructions as provided by a functional module 210a-210c and to execute these instructions, thereby performing any steps of the monitoring unit 200 as disclosed herein.

Figure 10:
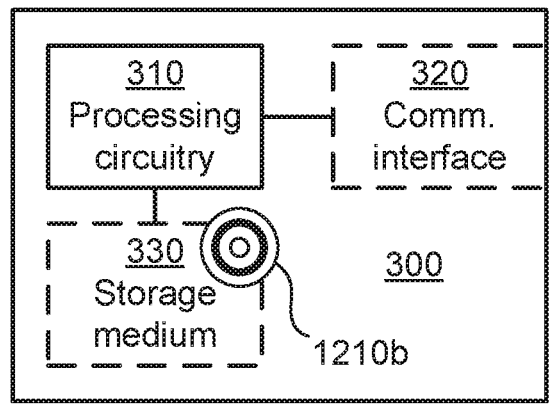
FIG. 10 is a schematic diagram showing functional units of a control node according to an embodiment.

FIG. 10 schematically illustrates, in terms of a number of functional units, the components of a control node 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1210b (as in FIG. 12), e.g. in the form of a storage medium 330. The processing circuitry 310 may further be provided as at least one application specific integrated circuit (ASIC), or field programmable gate array (FPGA).

Particularly, the processing circuitry 310 is configured to cause the control node 300 to perform a set of operations, or steps, S202-S208, as disclosed above. For example, the storage medium 330 may store the set of operations, and the processing circuitry 310 may be configured to retrieve the set of operations from the storage medium 330 to cause the control node 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The control node 300 may further comprise a communications interface 320 for communications with other entities, units, nodes, devices, and functions of the communications network 100. As such the communications interface 320 may comprise one or more transmitters and receivers, comprising analogue and digital components.

The processing circuitry 310 controls the general operation of the control node 300 e.g. by sending data and control signals to the communications interface 320 and the storage medium 330, by receiving data and reports from the communications interface 320, and by retrieving data and instructions from the storage medium 330. Other components, as well as the related functionality, of the control node 300 are omitted in order not to obscure the concepts presented herein.

Figure 11:
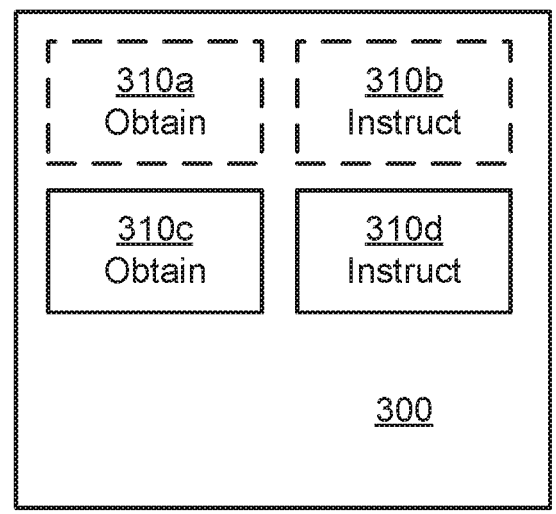
FIG. 11 is a schematic diagram showing functional modules of a control node according to an embodiment.

FIG. 11 schematically illustrates, in terms of a number of functional modules, the components of a control node 300 according to an embodiment. The control node 300 of FIG. 11 comprises a number of functional modules; an obtain module 310c configured to perform step S206 and an instruct module 310d configured to perform step S208. The control node 300 of FIG. 11 may further comprise a number of optional functional modules, such as any of an obtain module 310a configured to perform step S202 and an instruct module 310b configured to perform step S204. In general terms, each functional module 310a-310d may be implemented in hardware or in software. Preferably, one or more or all functional modules 310a-310d may be implemented by the processing circuitry 310, possibly in cooperation with the communications interface 320 and/or the storage medium 330. The processing circuitry 310 may thus be arranged to from the storage medium 330 fetch instructions as provided by a functional module 310a-310d and to execute these instructions, thereby performing any steps of the control node 300 as disclosed herein.

The monitoring unit 200 and/or control node 300 may be provided as a standalone device or as a part of at least one further device. Alternatively, functionality of the monitoring unit 200 and/or control node 300 may be distributed between at least two devices, or nodes. These at least two nodes, or devices, may either be part of the same network part (such as a radio access network, core network, or service network) or may be spread between at least two such network parts.

Thus, a first portion of the instructions performed by the monitoring unit 200 and/or control node 300 may be executed in a first device, and a second portion of the of the instructions performed by the monitoring unit 200 and/or control node 300 may be executed in a second device; the herein disclosed embodiments are not limited to any particular number of devices on which the instructions performed by the monitoring unit 200 and/or control node 300 may be executed. Hence, the methods according to the herein disclosed embodiments are suitable to be performed by a monitoring unit 200 and/or control node 300 residing in a cloud computational environment. Therefore, although a single processing circuitry 210, 310 is illustrated in FIGS. 8 and 10 the processing circuitry 210, 310 may be distributed among a plurality of devices, or nodes. The same applies to the functional modules 210a-210c, 310a-310d of FIGS. 9 and 11 and the computer programs 1220a, 1220b of FIG. 12 (see below).

Figure 12:
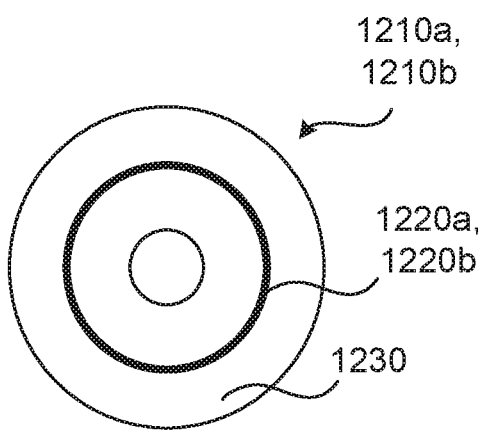
FIG. 12 shows one example of a computer program product comprising computer readable means according to an embodiment.

FIG. 12 shows one example of a computer program product 1210a, 1210b comprising computer readable means 1230. On this computer readable means 1230, a computer program 1220a can be stored, which computer program 1220a can cause the processing circuitry 210 and thereto operatively coupled entities and devices, such as the communications interface 220 and the storage medium 230, to execute methods according to embodiments described herein. The computer program 1220a and/or computer program product 1210a may thus provide means for performing any steps of the monitoring unit 200 as herein disclosed. On this computer readable means 1230, a computer program 1220b can be stored, which computer program 1220b can cause the processing circuitry 310 and thereto operatively coupled entities and devices, such as the communications interface 320 and the storage medium 330, to execute methods according to embodiments described herein. The computer program 1220b and/or computer program product 1210b may thus provide means for performing any steps of the control node 300 as herein disclosed.

In the example of FIG. 12, the computer program product 1210a, 1210b is illustrated as an optical disc, such as a CD (compact disc) or a DVD (digital versatile disc) or a Blu-Ray disc. The computer program product 1210a, 1210b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1220a, 1220b is here schematically shown as a track on the depicted optical disk, the computer program 1220a, 1220b can be stored in any way which is suitable for the computer program product 1210a, 1210b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for upgrading a piece of network equipment in a communication network, the method comprising:
obtaining, by a monitoring device, an indication of a need to perform an upgrade on the piece of network equipment; and
providing, by the monitoring device, based on the indication, an instruction to a control node that controls operations of the unmanned aerial vehicle for the unmanned aerial vehicle to perform the upgrade on the piece of network equipment, wherein the unmanned aerial vehicle is instructed by the control node based on the instruction to perform the upgrade on the piece of network equipment, and wherein the unmanned aerial vehicle is allowed to perform the upgrade on the piece of network equipment only after an authentication is successfully performed between the unmanned aerial vehicle and the piece of network equipment.

2. The method according to claim 1, wherein the indication is obtained as a notification from the piece of network equipment.

3. The method according to claim 2, wherein the notification comprises an indication of what upgrade is needed for the piece of network equipment.

4. The method according to claim 1, wherein the indication is defined by a lack of response to, or lack of communications with, the piece of network equipment.

5. The method according to claim 1, wherein the instruction comprises an identification of the piece of network equipment and location information of the piece of network equipment.

6. The method according to claim 1, wherein the instruction comprises an identification of: how to upgrade the piece of network equipment and/or a cause of the need to upgrade the piece of network equipment.

7. The method according to claim 1, further comprising:
providing, by the monitoring device, a further instruction to the control node for the unmanned aerial vehicle to perform diagnostics on the piece of network equipment, to perform maintenance of the piece of network equipment, and/or to enquire the piece of network equipment for information.

8. The method according to claim 7, wherein the instruction for the unmanned aerial vehicle to upgrade the piece of network equipment is a second instruction, and wherein the further instruction is provided before the second instruction is provided.

9. The method according to claim 1, further comprising:
unlocking a locked cabinet enclosing the piece of network equipment after the unmanned aerial vehicle is successfully authenticated by the piece of network equipment such that the unmanned aerial vehicle is allowed to access the piece of network equipment.

10. A method for upgrading a piece of network equipment in a communication network, the method comprising:
receiving, by a control node that controls operations of an unmanned aerial vehicle, an instruction from a monitoring device for the unmanned aerial vehicle to perform an upgrade on the piece of network equipment based on an indication of a need to perform the upgrade on the piece of network equipment obtained by the monitoring device; and
instructing, by the control node, based on the instruction, the unmanned aerial vehicle to perform the upgrade on the piece of network equipment, wherein the unmanned aerial vehicle is allowed to perform the upgrade on the piece of network equipment only after an authentication is successfully performed between the unmanned aerial vehicle and the piece of network equipment.

11. The method according to claim 10, wherein the unmanned aerial vehicle is selected from a plurality of unmanned aerial vehicles which are controlled by control node.

12. The method according to claim 11, wherein which unmanned aerial vehicle in the plurality of unmanned aerial vehicles to select is dependent on the identification of how to upgrade the piece of network equipment and/or the identification of the cause of the need to upgrade the piece of network equipment.

13. The method according to claim 10, wherein the instruction comprises an identification of the piece of network equipment and location information of the piece of network equipment.

14. The method according to claim 10, wherein the instruction comprises an identification of how to upgrade the piece of network equipment and/or an identification of a cause of the need to upgrade the piece of network equipment.

15. The method according to claim 14, wherein how to upgrade the piece of network equipment is dependent on a least one of: type of the upgrade; and storage capacity needed for the upgrade.

16. The method according to claim 10, wherein the unmanned aerial vehicle is allowed to upgrade the piece of network equipment only after the unmanned aerial vehicle is successfully authenticated by the piece of network equipment.

17. The method according to claim 10, wherein the unmanned aerial vehicle is provided with a near-field communications interface, a radio-frequency identification, RFID, tag, and/or a Bluetooth interface for the authentication.

18. The method according to claim 10, wherein the piece of network equipment is provided with a near-field communications interface, a radio-frequency identification, RFID, tag reader, and/or a Bluetooth interface the authentication.

19. The method according to claim 10, further comprising:
receiving, by the control node, a further instruction from the monitoring device for the unmanned aerial vehicle to perform diagnostics on the piece of network equipment, to perform maintenance of the piece of network equipment for information; and
instructing, by the control node, the unmanned aerial vehicle to perform diagnostics on the piece of network equipment, and/or to enquire the piece of network equipment for information.

20. The method according to claim 19, wherein the instruction for the unmanned aerial vehicle to perform the upgrade on the piece of network equipment is a second instruction, and wherein the further instruction is obtained before the second instruction is obtained.

21. The method according to claim 19, further comprising:
causing the unmanned aerial vehicle to perform diagnostics on the piece of network equipment, maintenance of the piece of network equipment, and/or enquiring the piece of network equipment for information.

22. The method according to claim 10, further comprising:
unlocking a locked cabinet enclosing the piece of network equipment after the unmanned aerial vehicle is successfully authenticated by the piece of network equipment such that the unmanned aerial vehicle is allowed to access the piece of network equipment.

23. The method according to claim 10, wherein the upgrade comprises physical interaction between the unmanned aerial vehicle and the piece of network equipment.

24. The method according to claim 23, wherein the unmanned aerial vehicle comprises a vertically and/or horizontally extending member configured for the physical interaction.

25. The method according to claim 23, wherein the piece of network equipment comprises a vertically and/or horizontally arranged interface configured for the physical interaction.

26. The method according to claim 10, wherein the upgrade comprises short-range wireless communications between the unmanned aerial vehicle and the piece of network equipment.

27. The method according to claim 10, wherein the upgrade comprises at least one of: rebooting the piece of network equipment; and updating software and/or firmware of the piece of network equipment.

28. The method according to claim 10, wherein the piece of network equipment is a radio access network node or a core network node.

* * * * *